United States Patent [19]

Smith

[11] Patent Number: 5,025,590

[45] Date of Patent: Jun. 25, 1991

[54] ROOT BALL BASKET

[76] Inventor: Peter J. Smith, 157 Parkhurst Rd., Gansevoort, N.Y. 12831

[21] Appl. No.: 367,356

[22] Filed: Jun. 16, 1989

[51] Int. Cl.⁵ ............................................. A01G 23/04
[52] U.S. Cl. ...................................... 47/76; 206/423; 47/78
[58] Field of Search .............. 220/19; 206/423; 47/73, 47/74, 75, 76, 77, 78

[56] References Cited

U.S. PATENT DOCUMENTS

| | | | |
|---|---|---|---|
| 835,585 | 11/1906 | Uffmann | 97/76 |
| 879,613 | 2/1908 | Edwards | 47/78 |
| 3,550,318 | 12/1970 | Remke | 206/423 X |
| 3,979,856 | 9/1976 | Belcher | 47/37 |
| 4,062,148 | 12/1977 | Edmonds, Jr. et al. | 47/76 |
| 4,250,654 | 2/1981 | Remke | 47/76 |
| 4,287,840 | 9/1981 | Weidner | 111/1 |
| 4,372,351 | 2/1983 | Myers | 220/19 X |
| 4,403,447 | 9/1983 | Braun | 47/76 |

Primary Examiner—David A. Scherbel
Assistant Examiner—Jerrold D. Johnson
Attorney, Agent, or Firm—Kevin R. Kepner

[57] ABSTRACT

Wire panels which are easily and readily adapted to any size tree or shrub root ball and which when attached together form a basket to preserve the integrity of the root ball are disclosed. The panels are formed in a criss cross configuration and are secured by rope, cord, twine or wire in a shoelace type tightening arrangement. It is also possible to preconnect several wire panels in a size corresponding to a commercial shade digger by use of an easily deforming wire link at the top and bottom of the panels. The wire panels provide the sizing flexibility to be used for any size tree or shrub root ball.

30 Claims, 4 Drawing Sheets

ROOT BALL BASKET

FIELD OF THE INVENTION

This invention relates to the apparatus for securing and retaining tree and shrub root balls which are used in the nursery business to secure the earthen balls during storage, transportation and planting of said trees and shrubs. Hereinafter in both the specification and claims the word "tree" shall be used to refer to both trees and shrubs.

BACKGROUND OF THE INVENTION

Nurserymen have long ago mastered the art of transplanting shrubs and trees from the nursery to the point of sale. This involves digging around the root system of the tree leaving a ball of earth which is then wrapped tightly to prevent loosening of life-giving earth from around the roots. This transplanting procedure is generally referred to as the "ball and burlap" method. These are two common methods of "balling and burlapping" trees for shipment.

This invention relates to apparatus for receiving tree root balls and methods for using such apparatus, particularly with respect to wire baskets for receiving said root balls. In commercial nursery operations, trees are dug from the ground by means of large mechanical diggers which typically consists of three or four large hydraulically operated spades or shovel type blades which dig into the earth around a tree and lift the tree out of the ground. The blades being a ball of earth with them which contains the roots of the tree. It is desirable to retain as much of this earthen ball as is possible so as to increase the chances of the survival of the tree when it is transplanted.

It is also desirable to protect the ball from cracking, crumbling or otherwise diminishing the integrity of said ball. This is usually accomplished by placing the ball in a wire basket or container that substantially conforms to the shape of the ball and then by twisting or crimping the wire strands so as to tighten the wire basket as much as possible around the ball. The wire strands are typically twisted or crimped by hand and the process is quite labor intensive, particularly when the basket does not conform closely to the shape of the ball.

The wire baskets must be fabricated to match the geometry of the particular brand of spade being used. In fact Belcher's invention (No. 3,979,856) specifically describes a basket which more closely matches a four blade spade. If a three bladed spade is used a matching shape basket is preferrable. Again this is to minimize wire twisting to tighten the basket around the ball.

In other instances in which trees are hand dug it is necessary to hand lace the root ball by means of wrapping the earthen ball with burlap and then tying the ball securely by what is known as a "drum lacing". This process is extremely time intensive and once completed the ball must still be mechanically removed from the excavation and the bottom opening secured by further lacing. There is currently not available a wire type basket for use in the hand dug tree procedure.

It is a problem inherent in present baskets to tighten the basket around the ball to secure it for shipment. There is felt need therefore to provide wire baskets which can be tightened more easily and more quickly. In addition there is need for a basket which will secure balls of various shapes. There is also a need for a wire basket that is easily removable upon planting. Finally there is need for a basket which can be used on hand dug balls (which vary greatly in size and shape) as well as on machine dug balls. There is also a for a wire basket that is easily removable upon planting.

SUMMARY OF THE INVENTION

It is an objective of this invention to provide a variable sized and easily adjustable container in which to secure, transport and plant an excavated root ball which has been dug either mechanically or by hand. It is a further objective of the invention to provide a means by which to secure the container in a short period of time so as to reduce the large amount of time which is currently required to tighten and secure the containers.

The objectives of this invention are obtained by a plurality of open wire panels which are essentially in the overall shape of a trapezoid. The individual wire panels are formed in a criss-cross pattern with the lower horizontal dimension being smaller and increasing in width as approaching the top of the basket. There are also vertical elongated loops which strengthen the panel and provide tie points to tighten and secure the bottom and top of the basket.

In use the panels are place circumferentially around the root ball and laced together in a shoelace type pattern with rope or twine, depending on the size of the ball, to draw the panels tightly around the ball. The vertical loops can then be laced together at the top and bottom of the ball so as to insure the integrity of the ball.

It is also possible to form the wire panels by using elongated loops of wire in a horizontal direction again with the lower loops being of a lesser horizontal dimension than the upper loops, with the panels being held together by the vertical elongated loops as previously discussed. The panels can alternatively be joined by means of a clamping device which can be attached to each corresponding horizontal loop and tightened by means of an over center type clamp or other clamping device.

In any of the configurations discussed herein, further tightening of the basket can be achieved by means of crimping or twisting the individual wire strands so as to obtain the ideal fit.

An important feature of the invention herein described is that any number of panels may be used to obtain the proper fit for the ball size. Additionally due to the ability to individually place the panels around the ball, it is possible to use the device on hand dug tree balls, which is not possible with the baskets available currently.

It is also possible to manufacture the panels in a configuration in which the panels are attached at top and bottom by wire links which can then be used as tie off points to lace the top and bottom of the ball. It would be most feasible to manufacture these preattached panels in a size that would be comparable to the spade blades of the commercial tree digging machines.

It is another aspect of the invention is that segments can be easily fabricated from a single piece of wire. Joining of segments to form a basket is a simple procedure. This should reduce fabrication time compared to conventional baskets.

DESCRIPTION OF THE PREFERRED EMBODIMENT

Figure 1:
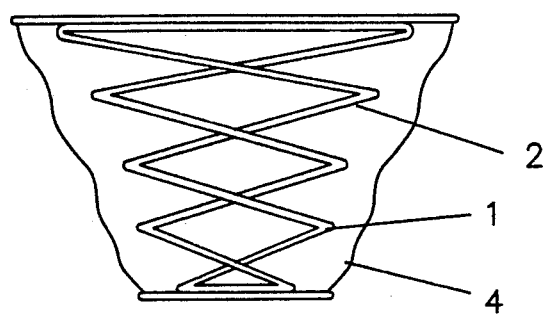
FIG. 1 - is a side elevation view of the preattached basket panel.
Figure 2:
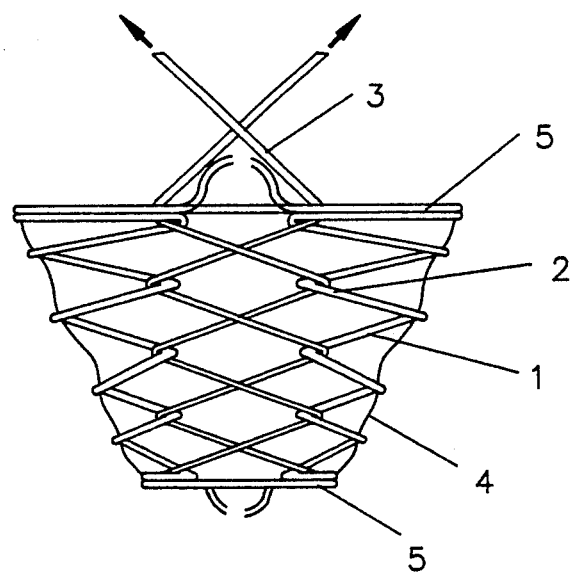
FIG. 2 - is a side elevation view showing the lacing configuration.
Figure 3:
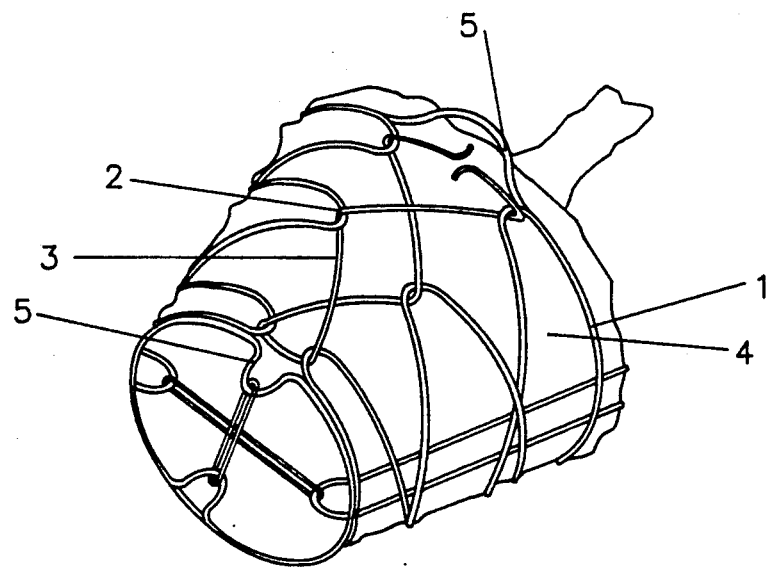
FIG. 3 - is a perspective view of the preconnected basket installed on a root ball.
Figure 4:
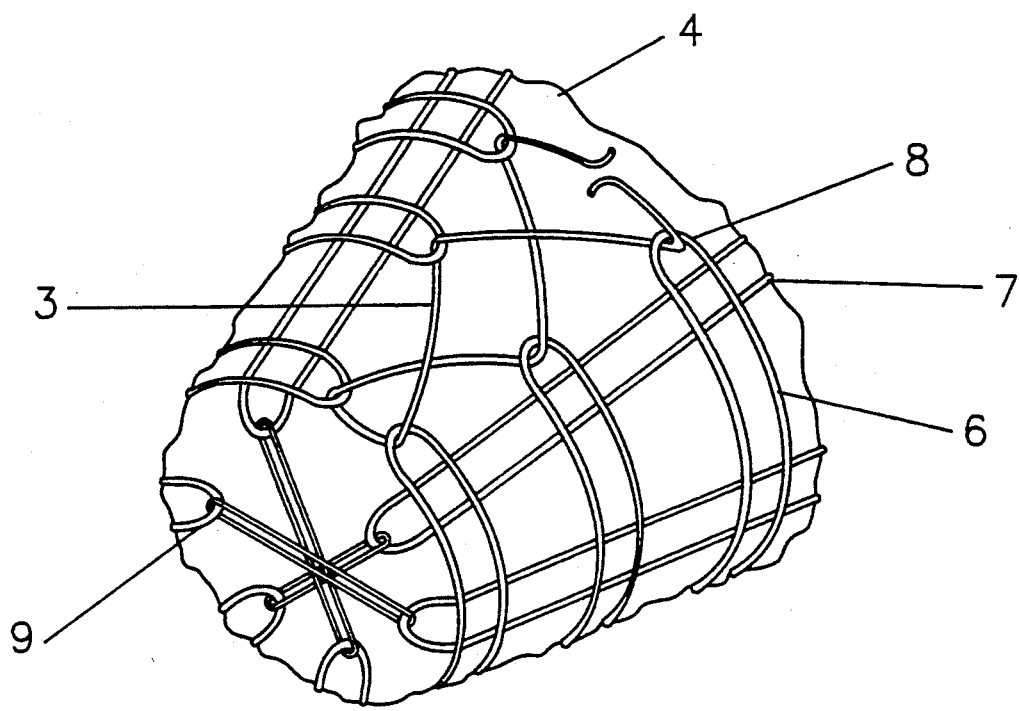
FIG. 4 - is a perspective view of the horizontal loop panels installed on a root ball.
Figure 5:
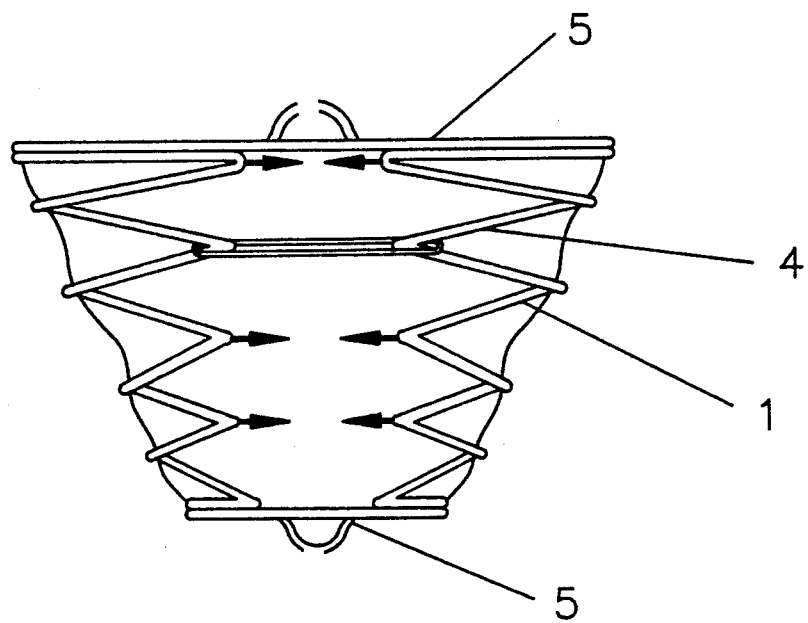
FIG. 5 - is a side elevation showing the circumferential tightening of the preconnected panels.
Figure 6:
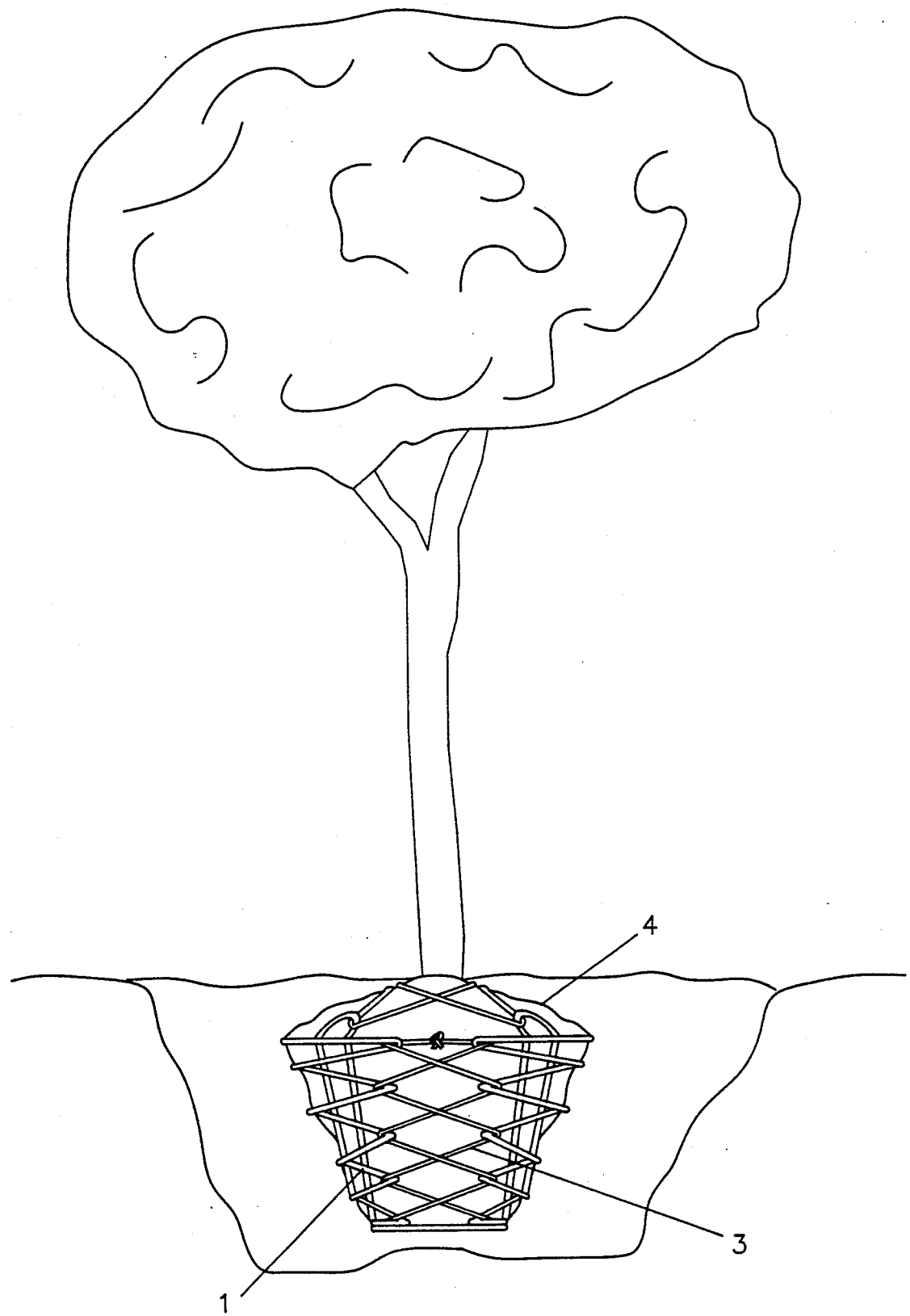
FIG. 6 - is a side elevation showing the individual panels applied in a hand dug situation.
Figure 7:
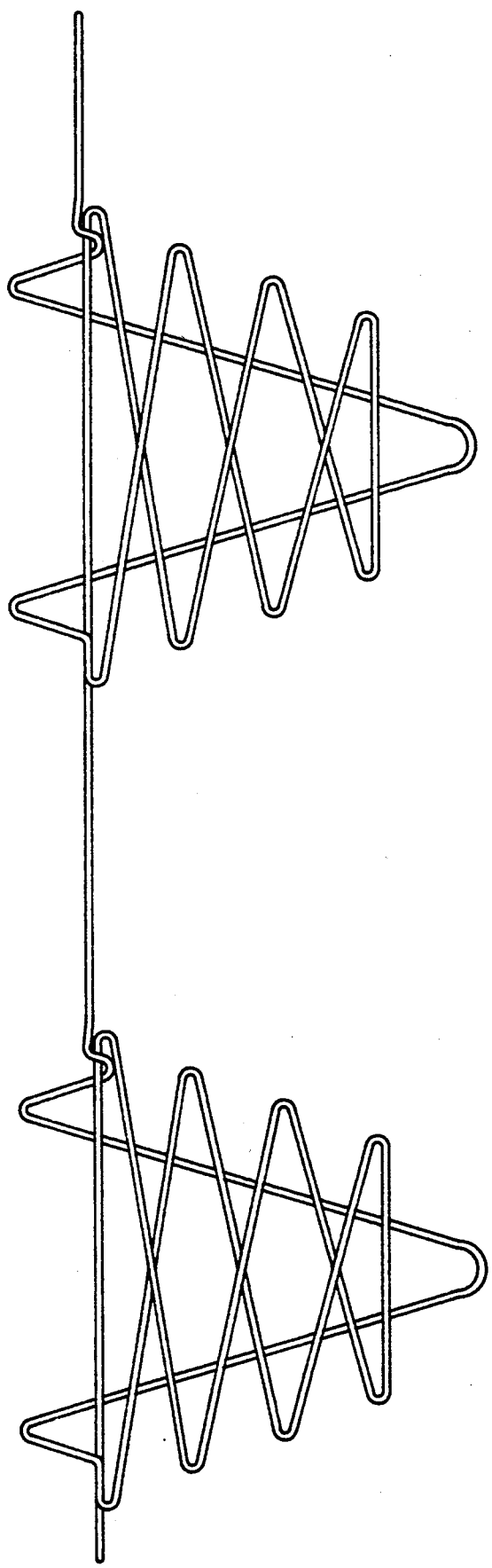
FIG. 7 - is a side elevation showing the panels as fabricated from a single length of wire.

This invention consists of a trapezoidal shaped wire panel 1 configured in what resembles a criss-cross type pattern similar to that of a shoelace. Each segment of a panel, ascending from the bottom to the top of a panel is wider than the segment below. As a result of the bending and the criss cross pattern, a loop 2 is formed at the periphery of each panel segment along the non parallel sides of the trapezoid. These loops provide the means through which to lace a cord 3 or twine, again in a shoelace type fashion, between two adjacent panels. A vertical force applied to the ends of the cord or twine results in a drawing together of the adjacent panels and a corresponding tightening of the panels around the tree root ball 4.

The panels may be preconnected to one another by means of a flexible circular wire band 5 attached at the top and bottom of the panels. Upon the drawing together and tightening of the panels, the flexible bands are deformed at the top and bottom of the panels and provide a tie off point through which to tighten and lace closed the top and bottom of the root ball basket.

It is also disclosed by this invention to create the panels from a series of successively wider closed horizontal loops 6 attached by vertical loops 7. The ends of the horizontal loops 8 provide the means through which to lace a cord or twine in the manner previously described and the ends of the vertical loops 9 provide the closure means for the top and bottom of the root ball basket.

The versatility of this invention is demonstrated by the ability to place individual panels 10 in the trench around the root ball of a hand dug tree and then to attach and tighten the panels to preserve the integrity of the root ball in an efficient and less time consuming manner. Further evidence of the invention's versatility is demonstrated by the ability to size the individual panels to closely corresponding to the size of the spades of a commercial spade digger so as to provide a basket that closely approximates the size of the dug root ball to further lessen the labor required to bind the root ball.

It is also apparent from the disclosure that the scope of the invention herein described is such that the panels may be fabricated from materials other than wire, and may be particularly adaptive to being formed by some form of molded plastic product.

What is claimed is:

1. An apparatus for preserving the integrity of a tree root ball, said apparatus comprising:
   a plurality of separate flexible wire panel sections sufficient to encompass the circumference of said tree root ball; and first adjusting means to tighten said panels circumferentially
   a second adjusting means to tighten said panels radially across the bottom of said root ball
   a third adjusting means to tighten said panels radially across the top of said root ball.

2. The device of claim 1 wherein said wire panel sections are trapezoidal in shape.

3. The device of claim 2 wherein said trapezoidal shaped panels comprise:
   a plurality of substantially vertical elongated loops; and a strand affixed to said vertical loops at a plurality of locations, said strand forming an essentially horizontal criss-cross pattern from the lower end of said vertical loops to the upper end of said loops.

4. The device of claim 3 wherein said first adjusting means comprises: a cord, laced between the horizontal loops of a first panel and the horizontal loops of a second panel formed by said strand of each said panels, in a criss cross pattern wherein vertical tension applied to the ends of said cord reduces the distance between said first panel and said second panel.

5. The device of claim 4 wherein said second adjusting means comprises:
   a plurality of cords wherein each of said cords is passed through the end of one said vertical loops of said first panel and one of said vertical loops of said second panel wherein the tightening of each cord reduces the distance between the ends of said vertical loops.

6. The device of claim 5 wherein said third adjusting means comprises:
   a plurality of cords wherein each of said cords is passed through the end of one said vertical loops of said first panel and one of said vertical loops of said second panel wherein the tightening of each cord reduces the distance between the ends of said vertical loops.

7. The device of claim 6 wherein said vertical elongated loops and said strand are wire.

8. The device of claim 6 wherein said vertical elongated loops and said strand are plastic.

9. The device of claim 6 wherein said vertical elongated loops and said strand are formed from a single length of wire.

10. The device of claim 9 wherein said first adjusting means comprises:
    a cord, laced between the horizontal loops of a first panel and the horizontal loops of a second panel formed by said strand of each said panels, in a criss cross pattern wherein vertical tension applied to the ends of said cord reduces the distance between said first panel and said second panel.

11. The device of claim 10 wherein said second adjusting means comprises:
    a plurality of cords wherein each of said cords is passed through the end of one said vertical loops of said first panel and one of said vertical loops of said second panel wherein the tightening of each cord reduces the distance between the ends of said vertical loops.

12. The device of claim 11 wherein said third adjusting means comprises:
    plurality of cords wherein each of said cords is passed through the end of one said vertical loops of said first panel and one of said vertical loops of said second panel wherein the tightening of each cord reduces the distance between the ends of said vertical loops.

13. The device of claim 9 wherein said first adjusting means comprises:

a plurality of over center clamps horizontally affixed between said horizontal loops of a first panel and said horizontal loops of a second panel.

14. The device of claim 13 wherein said second adjusting means comprises:

a plurality of over center clamps substantially radially affixed between said vertical loops of said first panel and said vertical loops of said second panel.

15. The device of claim 14 wherein said third adjusting means comprises:

a plurality of over center clamps substantially radially affixed between said vertical loops of said first panel and said vertical loops of said second panel.

16. The device or claim 15 wherein said first adjusting means comprises:

a plurality of cords where in each of said cords is horizontally affixed between one of said horizontal loops of a first panel and one of said horizontal loops of a second panel.

17. The device of claim 16 wherein said second adjusting means comprises:

a plurality of cords wherein each of said cords is radially affixed between one of said vertical loops of a first panel and one of said vertical loops of a second panel.

18. The device of claim 17 wherein said third adjusting means comprises:

a plurality of cords wherein each of said cords is radially affixed between one of said vertical loops of a first panel and one of said vertical loops of a second panel.

19. The device of claim 2 wherein said trapezoidal shaped panels comprise:

a plurality of substantially vertical elongated loops; and a plurality of substantially horizontal elongated loops securely fixed to said vertical loops at the points of intersection, said horizontal loops being of a lesser horizontal dimension at the lower end of said vertical loops and a larger horizontal dimension at the upper end of said vertical loops.

20. The device of claim 19 wherein said first adjusting means comprises:

a cord, laced between the horizontal loops of a first panel and the horizontal loops of a second panel formed by said strand of each said panels, in a criss cross pattern wherein vertical tension applied to the ends of said cord reduces the distance between said first panel and said second panel.

21. The device of claim 20 wherein said second adjusting means comprises:

a plurality of cords wherein each of said cords is passed through the end of one said vertical loops of said first panel and one of said vertical loops of said second panel wherein the tightening of each cord reduces the distance between the ends of said vertical loops.

22. The device of claim 21 wherein said third adjusting means comprises:

a plurality of cords wherein each of said cords is passed through the end of one said vertical loops of said first panel and one of said vertical loops of said second panel wherein the tightening of each cord reduces the distance between the ends of said vertical loops.

23. The device of claim 22 wherein said vertical elongated loops and said strand are wire.

24. The device of claim 22 in said vertical elongated loops and said strand are plastic.

25. The device of claim 19 wherein said first adjusting means comprises:

a plurality of over center clamps horizontally affixed bet said horizontal loops of a first panel and said horizontal loops of a second panel.

26. The device of claim 25 wherein said second adjusting means comprises:

a plurality of over center clamps substantially radially affixed between said vertical loops of said first panel and said vertical loops of said second panel.

27. The device of claim 26 wherein said third adjusting means comprises:

a plurality of over center clamps substantially radially affixed between said vertical loops of said first panel and said vertical loops of said second panel.

28. The device of claim 3 wherein said first adjusting means comprises:

a plurality of over center clamps horizontally affixed between said horizontal loops of a first panel and said horizontal loops of a second panel.

29. The device of claim 28 wherein said second adjusting means comprises:

a plurality of over center clamps substantially radially affixed between said vertical loops of said first panel and said vertical loops of said second panel.

30. The device of claim 29 wherein said third adjusting means comprises:

a plurality of over center clamps substantially radially affixed between said vertical loops of said first panel and said vertical loops of said second panel.

* * * * *